US008885055B2

(12) United States Patent
Tanaka et al.

(10) Patent No.: US 8,885,055 B2
(45) Date of Patent: Nov. 11, 2014

(54) CAMERA FOR CAPTURING MOVING IMAGES

(75) Inventors: Yukio Tanaka, Saitama (JP); Atsushi Koide, Saitama (JP)

(73) Assignee: Tamron Co., Ltd, Saitama (JP)

( * ) Notice: Subject to any disclaimer, the term of this patent is extended or adjusted under 35 U.S.C. 154(b) by 212 days.

(21) Appl. No.: 13/364,027

(22) Filed: Feb. 1, 2012

(65) Prior Publication Data

US 2012/0201526 A1 Aug. 9, 2012

(30) Foreign Application Priority Data

Feb. 3, 2011 (JP) ................... 2011-021507

(51) Int. Cl.
*H04N 5/228* (2006.01)
*H04N 5/225* (2006.01)
*H04N 5/232* (2006.01)
*G03B 5/00* (2006.01)
*F16F 7/00* (2006.01)
*G03B 17/56* (2006.01)

(52) U.S. Cl.
CPC ............. *H04N 5/225* (2013.01); *H04N 5/2328* (2013.01); *G03B 5/00* (2013.01); *F16F 7/00* (2013.01); *G03B 2217/005* (2013.01); *G03B 2205/0015* (2013.01); *G03B 17/561* (2013.01); *H04N 5/232* (2013.01)
USPC .............. 348/208.99; 348/373; 348/374

(58) Field of Classification Search
USPC ......... 348/208.99, 208.1–208.6, 208.11, 373, 348/375, 374, 143, 151, 153; 396/55, 396/419–428
See application file for complete search history.

(56) References Cited

U.S. PATENT DOCUMENTS

| 7,248,422 B2* | 7/2007 | Nishimoto ................... 359/830 |
| 7,720,366 B2 | 5/2010 | Iwasaki et al. |
| 7,751,645 B2* | 7/2010 | Reneker et al. ............... 382/275 |
| 2007/0058958 A1* | 3/2007 | Enomoto ........................ 396/55 |
| 2008/0013939 A1 | 1/2008 | Ogawa |
| 2011/0199482 A1* | 8/2011 | Morgan ........................ 348/143 |
| 2011/0262121 A1* | 10/2011 | Yanagisawa et al. ........... 396/55 |

FOREIGN PATENT DOCUMENTS

| CN | 101071250 A | 11/2007 |
| CN | 101106657 A | 1/2008 |
| JP | 2010-283520 | 12/2010 |

OTHER PUBLICATIONS

Official Action and Search Report issued Dec. 4, 2013, CN 201210025773.6.

* cited by examiner

*Primary Examiner* — Lin Ye
*Assistant Examiner* — Chan Nguyen
(74) *Attorney, Agent, or Firm* — Westerman, Hattori, Daniels & Adrian, LLP

(57) ABSTRACT

Provide a camera capable of effectively suppressing image blurring even when high frequency vibrations are imposed. The present invention is a camera for capturing moving images furnished with an image-blur prevention function, including an imaging unit (16) for capturing moving picture images and a support frame (12) equipped with a vibration-isolating support mechanism (18) for supporting this imaging unit; the imaging unit has imaging optics (22), an imaging element (20), and an anti-vibration mechanism (24) for stabilizing formed images; assuming $S_a(f)$ denotes the rate in dB of vibration attenuation produced by an anti-vibration mechanism, $S_p(f)$ denotes the rate in dB of vibration attenuation produced by a vibration-isolating support mechanism, $S_o$ denotes a predetermined target dB rate of attenuation, and $2f_0$ denotes a frame rate frequency for moving pictures captured by the imaging unit, then at frequencies at or greater than $f_0$, the expression $S_a(f)+S_p(f)<S_0$ obtains.

10 Claims, 6 Drawing Sheets

CAMERA FOR CAPTURING MOVING IMAGES

TECHNICAL FIELD

The present invention relates to a camera for capturing moving images, and more particularly to a camera for capturing moving images furnished with an image-blur prevention function.

BACKGROUND ART

In recent years, cameras equipped with an image-blur prevention function for capturing still images and or for capturing moving images have become common. In such cameras, blurring of images focused on an imaging element is suppressed by driving some of imaging lenses or imaging element in response to camera vibration. I.e., hand vibration arising when a user holds the camera is compensated by an image-blur prevention mechanism provided inside the camera.

On the other hand, surveillance cameras for continuously capturing moving images are normally affixed to structures such as buildings, mechanical structures, or the like, and are therefore not subject to hand vibration, and are generally not furnished with an image-blur prevention function. It has become evident, however, that image blurring also occurs in fixed position surveillance cameras, and surveillance cameras are increasingly being fitted with anti-vibration mechanisms.

PRIOR ART DOCUMENT

Patent Document

Patent Document 1
Unexamined Patent Application Publication 2010-283520

SUMMARY OF THE INVENTION

Problems Solved by the Invention

The problem, however, has been that in cameras used by affixing to a structural, vibration frequencies are high, and cannot be adequately compensated using an anti-vibration mechanism built into the camera. In other words, with hand vibrations occurring when a user holds a camera, the low frequency component dominates, while there is virtually no shaking above a certain level. Hand vibration can therefore be adequately compensated with an anti-vibration mechanism which detects camera vibration and, based thereon, drives an anti-vibration lens or image-capturing element using an actuator.

By contrast, in cameras affixed to structural objects the frequency of vibrations acting on the camera reaches far higher levels than those reached when a user holds a camera, making it impossible to respond by using an anti-vibration mechanism to drive an actuator, such that adequate compensation for vibration cannot be accomplished. For example, there is a particularly large high frequency vibration component of this type when a building is erected close to a railroad track, making it difficult to adequately compensate for vibration.

Moreover, when a high frequency shock vibration is applied to a camera, the anti-vibration mechanism built into the camera acts to compensate for such vibration. However, when subjected to high frequency vibration to which the anti-vibration mechanism is unable to respond, the anti-vibration mechanism seeks to operate the actuator at a time delay after the shocking vibration has been applied. The anti-vibration mechanism thus drives the anti-vibration lens or imaging element after the vibration applied to the camera terminates; in such cases, the problem arises that blurring of the image is actually increased by the presence of the anti-vibration mechanism in the camera.

The present invention therefore has the object of providing a camera for capturing moving images furnished with an image-blur prevention function capable of effectively suppressing image blurring even when subjected to high frequency vibrations.

Means for Resolving Problems

To resolve the above-described problems, the present invention is a camera for capturing moving images furnished with an image-blur prevention function, comprising an imaging unit for capturing moving picture images and a support frame equipped with a vibration-isolating support mechanism for supporting the imaging unit; wherein the imaging unit includes imaging optics, an imaging element for receiving light focused by the imaging optics, and an anti-vibration mechanism for stabilizing images formed on the imaging element; and wherein the anti-vibration mechanism and vibration-isolating support mechanism are adapted to satisfy the inequality: $S_a(f)+S_p(f)<S_o$, for $f>=f_0$ where $S_a(f)$ denotes the rate in dB of vibration attenuation produced by the anti-vibration mechanism at a frequency f, $S_p(f)$ denotes the rate in dB of vibration attenuation produced by the vibration-isolating support mechanism at a frequency f, $S_o$ denotes a predetermined target dB rate of attenuation, and $2f_0$ denotes a frame rate frequency for moving images captured by the imaging unit.

In the present invention thus constituted, the imaging unit for capturing moving pictures is supported by a support frame via a vibration-isolating support mechanism. The imaging unit is furnished with an anti-vibration mechanism to stabilize images focused on the imaging element by the imaging optics. The anti-vibration mechanism and the vibration-isolating support mechanism are adapted such that the inequality: $S_a(f)+S_p(f)<S_0$, for $f>=f_0$ is satisfied, when assuming $S_a(f)$ denotes the rate in dB of vibration attenuation produced by an anti-vibration mechanism at a frequency f, $S_p(f)$ denotes the rate in dB of vibration attenuation produced by a vibration-isolating support mechanism at a frequency f, $S_0$ denotes a predetermined target dB rate of attenuation, and $2f_0$ denotes a frame rate frequency for moving images captured by the imaging unit.

In the present invention thus constituted, effective suppression of image blurring can be accomplished by the synergistic effect of the vibration-isolating support mechanism and the anti-vibration mechanism, even when a high frequency vibration is imposed on the camera.

In the present invention the anti-vibration mechanism and vibration-isolating support mechanism are preferably constituted so that at frequencies higher than a predetermined cross frequency $f_c$, the amount of vibration attenuation resulting from the vibration-isolating support mechanism is greater than the amount of vibration attenuation resulting from the anti-vibration mechanism, and at frequencies lower than the cross frequency $f_c$, the amount of vibration attenuation resulting from the anti-vibration mechanism is greater than the amount of vibration attenuation resulting from the vibration-isolating support mechanism.

In the present invention thus constituted, vibration at frequencies higher than the cross frequency $f_c$ are primarily attenuated by the vibration-isolating support mechanism, thereby high frequency vibrations acting on the anti-vibration mechanism built into the imaging unit are suppressed, and avoiding the problem that image blurring is conversely increased by the anti-vibration mechanism to which high frequency vibration is imposed on. Vibrations at frequencies below the cross frequency $f_c$ are primarily attenuated by the anti-vibration mechanism, therefore support of the imaging unit can be prevented from becoming unstable by implementing the vibration-attenuating effect of the vibration-isolating support mechanism down into the low frequencies.

In the present invention the predetermined cross frequency $f_c$ is preferably between 20 and 40 Hz.

In the present invention thus constituted, the cross frequency $f_c$ is set to between 20 and 40 Hz, thus facilitating design of the anti-vibration mechanism and the vibration-isolating support mechanism.

In the present invention the anti-vibration mechanism and the vibration-isolating support mechanism are preferably constituted so that at a frequency of 10 Hz, the amount of vibration attenuation resulting from the anti-vibration mechanism is 6 dB or greater above the amount of vibration attenuation resulting from the vibration-isolating support mechanism.

In the present invention thus constituted, the amount of vibration attenuation resulting from the vibration-isolating support mechanism at low frequencies can be set sufficiently small so that shaking of the imaging unit caused by support using the vibration-isolating support mechanism can be sufficiently suppressed.

In the present invention the vibration-isolating support mechanism has an arm rotatably attached to a support frame, a spring and damper for imparting viscoelastic force to the rotation of this arm, and a clamp member for connecting the arm and the imaging unit, slidably attached to the arm in the direction of the optical axis of the imaging optics; the rate of vibration attenuation is adjusted by sliding the clamp member.

Using the present invention thus constituted, in the camera constituted so that all or a part of the imaging unit is interchangeable, characteristics of the vibration-isolating support mechanism can be easily adjusted to fit the mounted imaging unit, thus enabling appropriate setting of the image-blur prevention effect.

In the present invention the vibration-isolating support mechanism is preferably disposed on both sides of a plane which includes the optical axis of the imaging optics.

In the present invention thus constituted, the imaging unit is supported with good balance by the vibration-isolating support mechanism, therefore excitation of vibration in a direction perpendicular to the optical axis when vibration is applied in the optical axis direction of the camera can be prevented.

In the present invention there is preferably, furthermore, a vibration-isolating support mechanism adjustment indicator portion for indicating the amount of displacement of the imaging unit relative to the support frame.

In the present invention thus constituted, the vibration-isolating support mechanism can be easily adjusted to appropriate characteristics by referring to the vibration-isolating support mechanism indicator portion.

In the present invention the support frame is preferably a case covering at least a portion of the imaging unit.

In the present invention thus constituted, the support frame covers the imaging unit, therefore the imaging unit can be protected.

The present invention is a camera for capturing moving images furnished with an image-blur prevention function, having an imaging unit for capturing moving images and a support frame furnished with a vibration-isolating support mechanism for supporting this imaging unit; the imaging unit has imaging optics, an imaging element for receiving light focused by these imaging optics, and an anti-vibration mechanism for stabilizing images formed on the imaging element; and the vibration-isolating support mechanism is a block-shaped or cylindrical viscoelastic member for connecting the imaging unit and the support frame.

In the present invention thus constituted, the imaging unit for capturing moving pictures is supported by a support frame via a vibration-isolating support mechanism. The imaging unit is furnished with an anti-vibration mechanism, and images focused on the imaging element by the imaging optics are stabilized. The vibration-isolating support mechanism is a block-shaped or cylindrical viscoelastic member for connecting the imaging unit and the support frame.

In the present invention thus constituted, the vibration-isolating support mechanism can be simply constituted by a viscoelastic member, and effective suppression of image blurring can be accomplished by the synergistic effect of the vibration-isolating support mechanism and the anti-vibration mechanism, even when a high frequency vibration is imposed on the camera.

In the present invention the block-shaped or cylindrical viscoelastic members connect the imaging unit and the support frame so as to shear deform when the imaging unit is displaced in a direction perpendicular to the optical axis of the imaging optics relative to the support frame.

In the present invention thus constituted, the shear deformation of the viscoelastic member effectively absorbs vibration energy, effectively attenuating vibrations transferred to the imaging unit.

In the present invention the vibration-isolating support mechanism is preferably disposed at a position rotationally symmetrical to an axial line passing through the center of gravity of the imaging unit, and parallel to the optical axis of the imaging optics.

In the present invention thus constituted, the vibration-isolating support mechanism is disposed at a position rotationally symmetrical to an axial line parallel to the optical axis of the imaging optics, therefore the imaging unit can be supported in a well-balanced manner, and excitation of vibration causing the optical axis of the imaging unit to rotate about the center when vibration is applied in a direction perpendicular to the optical axis can be suppressed.

In the present invention the vibration-isolating support mechanism is preferably disposed on both sides of a plane passing through the center of gravity of the imaging unit and perpendicular to the optical axis of the imaging optics, such that when external forces within the plane are applied to the imaging unit, the optical axis of the imaging optics moves essentially parallel thereto.

In the present invention thus constituted, the imaging unit can be supported in a well-balanced manner, and excitation of vibration causing the optical axis of the imaging unit to tilt when vibration is applied in a direction perpendicular to the optical axis can be suppressed.

In the present invention the camera is preferably a surveillance camera used by affixing a support frame to a structural object.

In the present invention thus constituted, image blurring can be effectively suppressed and clear surveillance images captured even when the structural object to which the support frame is affixed vibrates at a high frequency.

In the present invention the imaging element is preferably constituted to capture infrared light images.

In the present invention thus constituted, images can be captured even in dark locations.

Effect of the Invention

Using the camera of the present invention, image blurring can be effectively suppressed even when high frequency vibrations are applied.

EMBODIMENTS OF THE INVENTION

Next, referring to the attached figures, we discuss preferred embodiments of the present invention.

Figure 1:
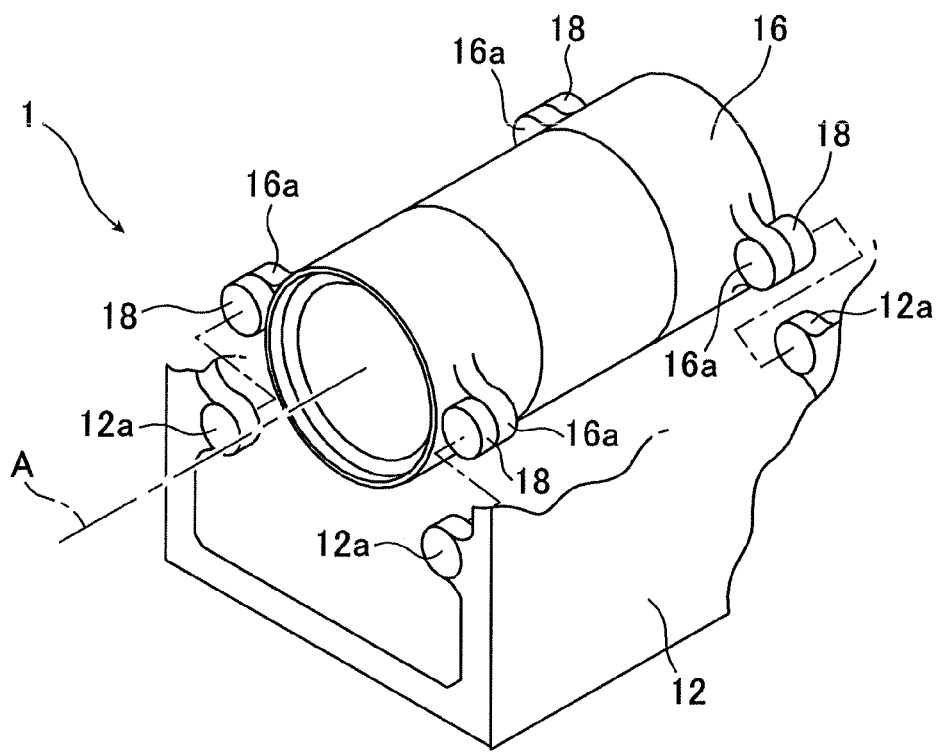
FIG. 1: A perspective view of a surveillance camera according to a first embodiment of the present invention.
Figure 2:
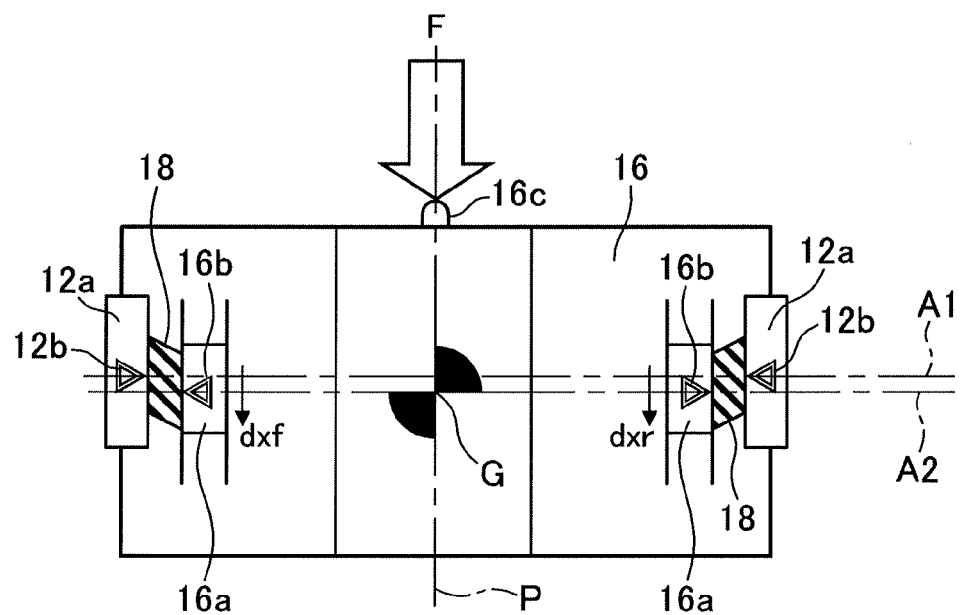
FIG. 2 A diagram in which an imaging unit support mechanism is modeled.

First, referring to FIGS. 1 through 7, we discuss a surveillance camera according to a first embodiment of the present invention. FIG. 1 is a perspective view of a surveillance camera according to the first embodiment. FIG. 2 is a diagram showing a modeling of an imaging unit support mechanism.

As shown in FIG. 1, the surveillance camera 1 serving as camera for capturing moving images has a camera external case 12 and an imaging unit 16 supported inside this camera external case 12.

The camera external case 12 is a rectangular parallelepiped-shaped case open at the front, within which the imaging unit 16 is housed.

As shown in FIG. 1, the imaging unit 16 is supported in a vibration-isolated manner within the camera external case 12 by viscoelastic members 18 serving as a vibration-isolating support mechanism. The viscoelastic members 18 are block-shaped members constituted of viscoelastic material, and serve to connect the imaging unit 16 camera-side attachment portions 16a to the camera external case 12 case-side attachment portions 12a. Predetermined frequencies of vibration can be prevented from acting on the imaging unit 16 by supporting the imaging unit 16 using viscoelastic members 18.

As shown in FIG. 1, in the present embodiment there are two viscoelastic members 18 attached at the front edge portion of the imaging unit 16, and two attached at the rear edge portion thereof. Therefore in the present embodiment the viscoelastic members 18 are disposed at both sides of a plane including the optical axis A of the imaging unit 16. The viscoelastic members 18 are also disposed at positions equidistant from the optical axis A. Therefore the viscoelastic members 18 are disposed at positions rotationally symmetrical relative to an axial line parallel to the optical axis A.

Furthermore, as shown in FIG. 2, in the present embodiment the viscoelastic members 18 pass through the center of gravity G of the imaging unit 16, and are constituted and positioned so that the optical axis A moves in parallel when a thrust force is applied in a direction perpendicular to the optical axis A of the imaging unit 16. I.e., the viscoelastic members 18 are constituted to balance the moment of the forces around the center of gravity G of the imaging unit 16 imparted to the imaging unit 16 by the respective elastic forces; in the FIG. 2 example the optical axis A positioned on axial line A1 is caused by the application of thrust force F to optical axis A to move parallel to the axial line A2.

Also, as shown in FIG. 2, each of the viscoelastic members 18 is connected to the imaging unit 16 and the camera external case 12 so as to shear-deform when the imaging unit 16 is vibrated in a direction perpendicular to the optical axis A.

In addition, a center of gravity index 16c is provided on the imaging unit 16 such that it passes through the center of gravity G thereof and is positioned within a plane P perpendicular to the optical axis A of the imaging unit 16. Therefore the application of thrust force F to the center of gravity index 16c in a direction perpendicular to the optical axis causes the line of action of the thrust force F to pass through the center of gravity G. By constituting and positioning each of the viscoelastic members 18 so that the optical axis A is moved in parallel by the thrust force F, there is no excitation of rotational vibration on the imaging unit 16 when the camera external case 12 is vibrated translationally in a direction perpendicular to the optical axis A.

As shown in FIG. 2, camera-side indicator portions 16b and case-side indicator portions 12b are respectively attached to the imaging unit 16 camera-side attachment portions 16a and the camera external case 12 case-side attachment portions 12a. Each of the camera-side indicator portions 16b and case-side indicator portions 12b is attached so as to mutually align when no thrust force F is applied, and each of the camera-side indicator portions 16b is displaced by the application of thrust force F, moving away from the case-side indicator portions 12b. Whether or not the optical axis A of the imaging unit 16 has been parallelly moved can be confirmed by measuring the displacement by the thrust force F of each of the camera-side indicator portions 16b.

Figure 3:
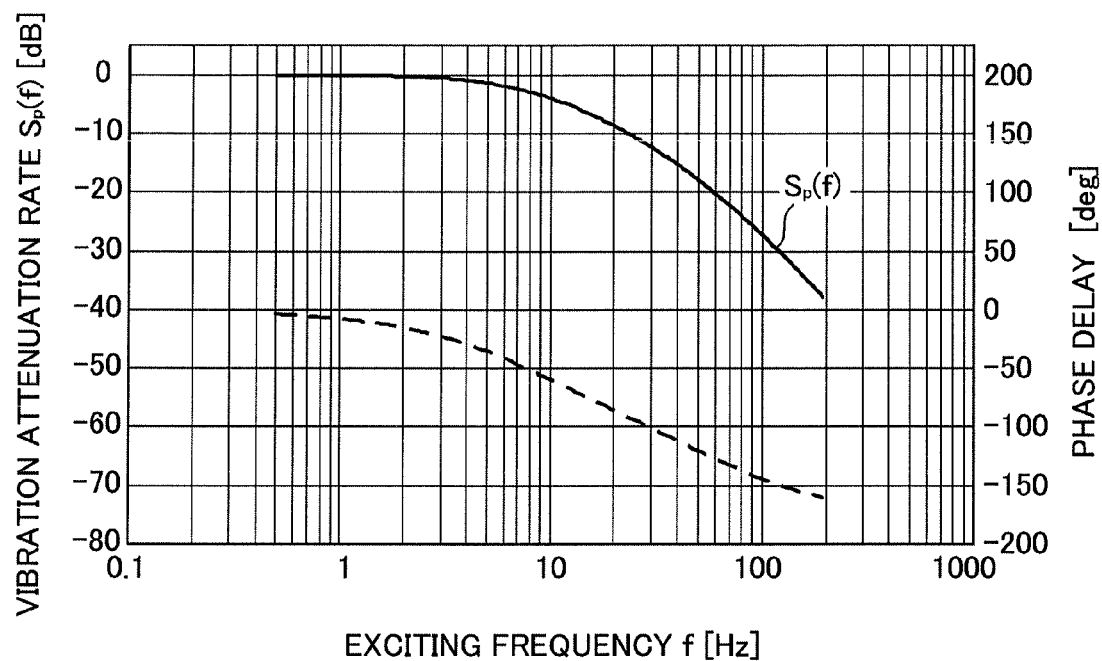
FIG. 3 A graph showing an example of a vibration attenuation rate using viscoelastic members as a vibration-isolating support mechanism.

Next, referring to FIG. 3, we discuss the vibration attenuation effect of the viscoelastic members 18. FIG. 3 is graph showing an example of the vibration attenuation rate using a viscoelastic member serving as vibration-isolating support mechanism.

In FIG. 3, the solid line shows the vibration attenuation rate in dB resulting from support of the imaging unit 16 by the viscoelastic members 18, and the dotted line shows the phase delay in the vibration of the imaging unit 16. As shown in FIG. 3, vibration of the imaging unit 16 is attenuated by the support of the viscoelastic members 18; at 1 Hz the dB rate of vibration attenuation is approximately 0 dB; at 10 Hz it is approximately −4 dB; at 30 Hz approximately −12 dB, and at 60 Hz approximately −20 dB; the amount of attenuation increases with frequency.

Figure 4:
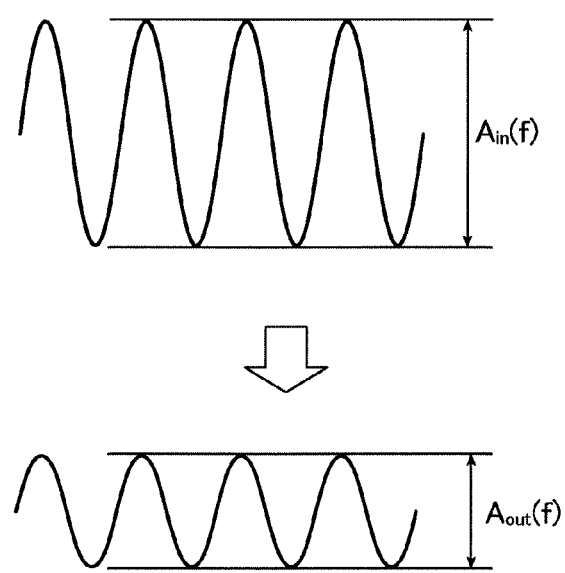
FIG. 4 A diagram schematically showing vibrational displacement of the camera external case and vibrational displacement of the imaging unit.

Next, referring to FIG. 4, we discuss the definition of vibration attenuation rate in the present Specification. FIG. 4 is a diagram schematically showing the vibrational displacement of the camera external case 12 and the imaging unit 16.

As shown in FIG. 4, when the camera external case 12 is caused to vibrate sinusoidally in a direction perpendicular to the optical axis A, the imaging unit 16, supported within the camera external case 12 by the viscoelastic members 18, is also vibrated. At this point the imaging unit 16 is vibrated in an essentially sinusoidal form in a direction perpendicular to the optical axis A, and although the phase does not necessarily match that of the vibration of the camera external case 12, it vibrates at the same frequency as the camera external case 12. Here, if fHz is the frequency of the vibration being imposed on the camera external case 12, $A_{in}(f)$ is the displacement amplitude, and $A_{out}(f)$ is the displacement amplitude at which the imaging unit 16 is vibrated, the expression if dB for the rate of vibration attenuation $S_p(f)$ by the viscoelastic members 18 is calculated as $$S_p(f)=20\ \log_{10}(A_{out}(f))/A_{in}(f). \tag{1}$$

Figure 5:
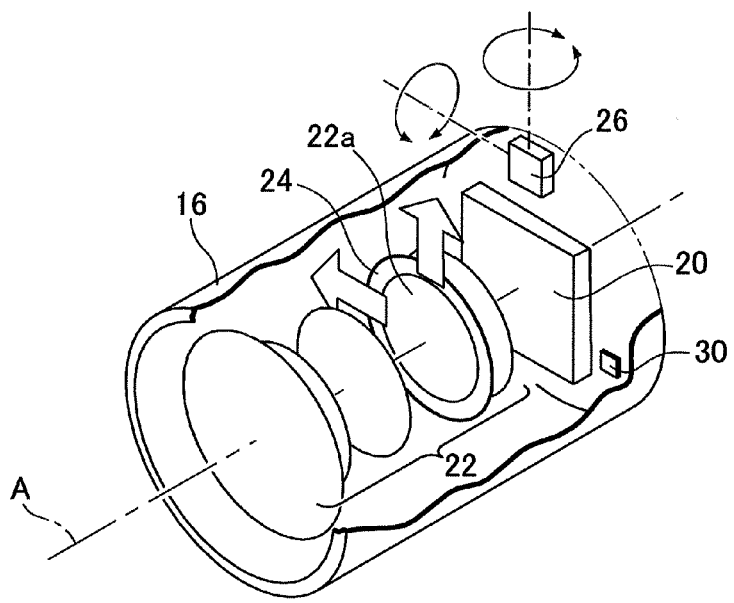
FIG. 5 A perspective view schematically showing the constitution of an imaging unit.

Next, referring to FIG. 5, we discuss the imaging unit 16. FIG. 5 is a perspective view schematically showing the constitution of the imaging unit 16.

As shown in FIG. 5, built into the imaging unit 16 are an imaging element 20, imaging optics 22 for focusing images on this imaging element 20, and an anti-vibration actuator 24 for driving an image-blur prevention lens 22a within these imaging optics 22, and for stabilizing the focused image. Also built into this imaging unit 16 is a camera gyro sensor 26, which is a camera vibration detection means for detecting the rotational angular velocity of the imaging unit 16. Built into the imaging unit 16 is also a control section 30 for controlling the anti-vibration actuator 24 based on detection signals from the camera gyro sensor 26. Therefore the anti-vibration actuator 24 functions as an anti-vibration mechanism.

The imaging element 20 is constituted to convert images focused on the imaging element 20 into electrical signals. In the present embodiment the imaging element 20 is constituted to capture infrared light images.

The imaging optics 22 are constituted to focus light incident on the imaging unit 16 onto the imaging element 20. A portion of the lenses in the imaging optics 22 are provided as an image-blur prevention lens 22a; by moving this image-blur prevention lens 22a using the anti-vibration actuator 24, blurring of the image formed on the imaging element 20 can be suppressed even when the imaging unit 16 vibrates.

The anti-vibration actuator 24 is constituted to move the image-blur prevention lens 22a within a plane perpendicular to the optical axis A. The anti-vibration actuator 24 has two linear motors (not shown) for driving the image-blur prevention lens 22a within a plane perpendicular to the optical axis A, and two position sensors (not shown) for detecting the position to which the image-blur prevention lens 22a is moved. The two linear motors (not shown) are respectively disposed to drive the image-blur prevention lens 22a in mutually perpendicular X and Y directions within a plane perpendicular to the optical axis A. This permits the image-blur prevention lens 22a to be translationally moved to any desired position within a plane perpendicular to the optical axis A. The position sensor (not shown) is disposed to detect movement of the image-blur prevention lens 22a in the X and Y directions.

Note that the anti-vibration actuator may also be provided with three or more linear motors and may be constituted as an anti-vibration actuator capable of rotating the anti-vibration lens, in addition to moving it in the X and Y directions.

A camera gyro sensor 26 is attached to the imaging unit 16, and is constituted to detect the rotational angular velocity of the imaging unit 16. Also, built into the camera gyro sensor 26 is an X sensor portion (not shown) for detecting rotational angular velocity around the X axis within a plane perpendicular to the optical axis A, and a Y sensor portion (not shown) for detecting rotational angular velocity around the Y axis, so that the gyro sensor is able to detect rotational angular velocity in each direction. The angular velocity signal detected by the camera gyro sensor 26 is input to the control section 30.

The control section 30 controls blurring of images formed on the imaging element 20 by controlling the anti-vibration actuator 24, based on the detected signal from the camera gyro sensor 26. The control section 30 calculates the position to which the image-blur prevention lens 22a is to be moved based on the signal input from the camera gyro sensor 26. In addition, the control section 30 detects signals from linear motors (not shown) and moves the image-blur prevention lens 22a toward the calculated position. The position to which the image-blur prevention lens 22a is moved is detected by a position sensor (not shown) and fed back to the control section 30. Note that the control section 30 can be constituted by various types of computing circuits, or by an analog circuit such as a filter or the like. Alternatively, the control section 30 may be constituted by an A/D converter for converting detected signals into digital data, a microprocessor for performing various computations, and a D/A converter for converting digital data into analog signals and outputting same.

Figure 6:
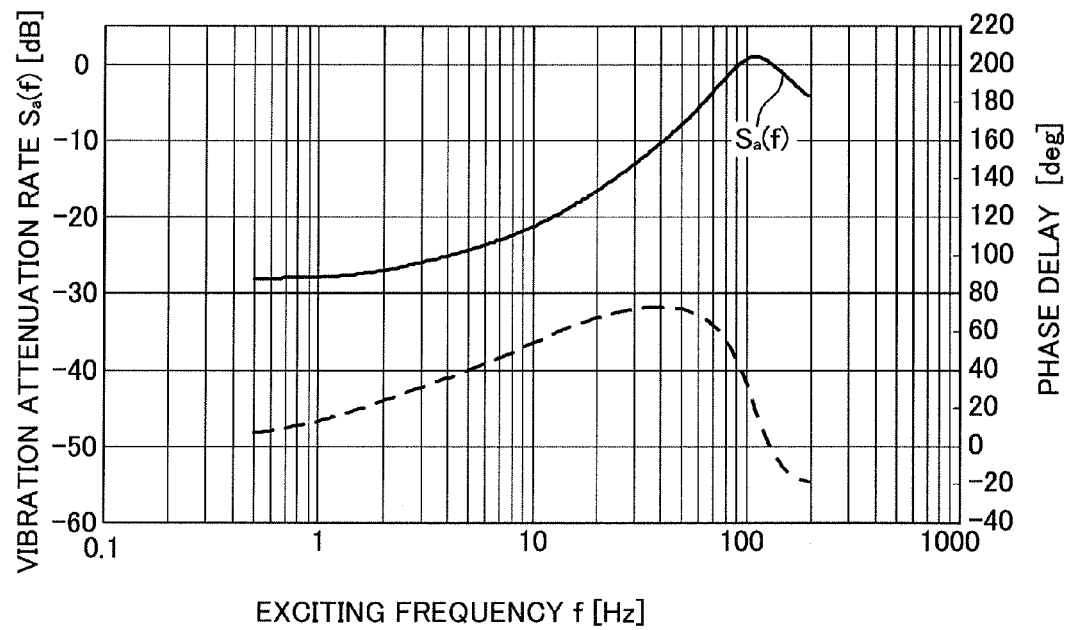
FIG. 6 A graph showing an example of the vibration attenuation rate using an anti-vibration actuator serving as anti-vibration mechanism.

Next, referring to FIG. 6, we discuss the vibration attenuation effect of the anti-vibration actuator 24. FIG. 6 is a graph showing an example of the vibration attenuation rate using an anti-vibration actuator serving as anti-vibration mechanism.

In FIG. 6, the solid line shows the vibration attenuation rate in dB of the image formed on the imaging element 20 by driving the image-blur prevention lens 22a with the anti-vibration actuator 24, and the dotted line shows the phase delay in the vibration of the image formed on the imaging element 20. As shown in FIG. 6, vibration of the image formed on the imaging element 20 is attenuated by driving the image-blur prevention lens 22a; at 1 Hz the dB rate of vibration attenuation is approximately −28 dB; at 10 Hz it is approximately −21 dB; at 30 Hz it is approximately −13 dB, and at 60 Hz it is approximately −6 dB; the amount of attenuation increases as frequency is reduced.

Next we discuss the rate of vibration attenuation in the image formed on the imaging element 20.

First, the image formed on the imaging element 20 also shakes when the imaging unit 16 is caused to vibrate in a sinusoidal form in a direction perpendicular to the optical axis A. In response, the image-blur prevention lens 22a is driven by the anti-vibration actuator 24 and shaking of the image formed on the imaging element 20 is suppressed, but some approximately sinusoidal vibration at the same frequency as the vibration of the imaging unit 16 remains in the image. Note that, as shown in FIG. 6, the phase of the image shake does not necessarily match the phase of the vibration of the imaging unit 16. Here, if fHz is the frequency at which the imaging 16 vibrates, $A_{in}(f)$ is the displacement amplitude of the vibration of the image formed on the imaging element 20 when prevention lens 22a is not driven relative to vibration of the imaging unit 16 (the prevention lens 22a is fixed), and $A_{out}(f)$ is the displacement amplitude when the image shakes when the prevention lens 22a is driven, the dB notation of the vibration attenuation rate $S_a(f)$ resulting from driving the prevention lens 22a is calculated as $$S_a(f)=20\log_{10}(A_{out}(f)/A_{in}(f)) \tag{2}.$$

Figure 7:
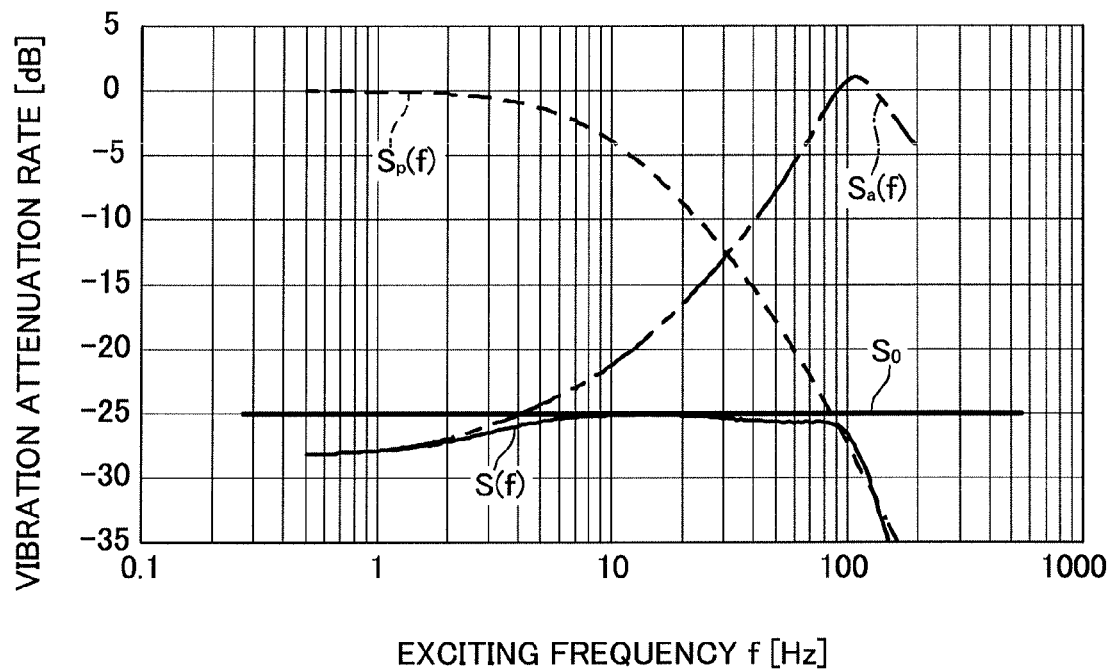
FIG. 7 A graph showing the overall vibration attenuation rate in a surveillance camera according to a first embodiment of the present invention.

Next, referring to FIG. 7, we discuss the attenuation effect on the shaking of images formed on the imaging element 20 when the camera external case 12 is vibrated. FIG. 7 is a graph showing the overall rate of vibration attenuation in surveillance camera 1.

In FIG. 7, the vibration attenuation rate $S_p(f)$ resulting from the viscoelastic members 18 is shown by a dotted line, the vibration attenuation $S_a(f)$ resulting from the anti-vibration actuator 24 is shown by a dot-and-dash line, and the combination of these vibration attenuation rates $S(f)$ is shown by a solid line.

As shown in FIG. 7, vibration applied to the surveillance camera 1 camera external case 12 is attenuated by the viscoelastic members 18, as shown by vibration attenuation rate $S_p(f)$, and the remaining vibration is transferred to the imaging unit 16. Shaking of images formed on the imaging element 20 caused by vibration transferred to the imaging unit 16 is attenuated by the anti-vibration actuator 24 as shown by the vibration attenuation rate $S_a(f)$. Therefore shaking of images formed on the imaging element 20 caused by vibration applied to the camera external case 12 is expressed by the sum $S(f)$ of the vibration attenuation rate $S_p(f)$ resulting from the viscoelastic members 18 and the vibration attenuation rate $S_a(f)$ resulting from the anti-vibration actuator 24.

In the present embodiment the viscoelastic members 18 and the anti-vibration actuator 24 are designed so that, at a frequency band of $f_0$ Hz or greater, which is ½ the frequency of the captured movie frame rate, the combination of their vibration attenuation rates $S(f)$ is smaller than $S_0$=−25 dB, which is the target attenuation rate (values increase on the negative side). Note that in the present embodiment the frame rate frequency is approximately 30 Hz, so that $f_0$=approximately 15 Hz.

In this embodiment, the vibration attenuation rate $S_p(f)$ resulting from the viscoelastic members 18 and the vibration attenuation $S_a(f)$ resulting from the anti-vibration actuator 24 are designed to intersect at the cross frequency $f_c$ (=30 Hz). In other words, the design is such that in the frequency domain below the cross frequency $f_c$, the amount of vibration attenuation resulting from the anti-vibration actuator 24 is larger than the amount of vibration attenuation resulting from the viscoelastic members 18 ($S_a(f)$ is larger on the minus side than $S_p(f)$), and in the frequency domain above the cross frequency $f_c$, the amount of vibration attenuation resulting from the viscoelastic members 18 is larger than the amount of vibration attenuation resulting from the anti-vibration actuator 24 18 ($S_p(f)$ is larger on the minus side than $S_a(f)$). Also, the vibration attenuation rate $S_a(f)$ and $S_p(f)$ at the cross frequency $f_c$ is −13 dB, which is approximately ½ of the target vibration attenuation rate $S_0$. The cross frequency $f_c$ is preferably set at 20 to 40 Hz.

In addition, in the present embodiment the amount of vibration attenuation resulting from the anti-vibration actuator 24 at 1 Hz is designed to be approximately 28 dB greater than the vibration attenuation amount resulting from the viscoelastic members 18, and the amount of vibration attenuation by the anti-vibration actuator 24 at 15 Hz is designed to be approximately 15 dB greater than that resulting from the viscoelastic members 18. In other words, the design is such that in a frequency band of about 15 Hz and below, the amount of vibration attenuation resulting from the viscoelastic members 18 is minute, and the majority of the vibration attenuation amount results from the anti-vibration actuator 24. The design is preferably such that at the frequency—approximately 10 Hz—at which the amount of vibration attenuation resulting from the anti-vibration actuator 24 is sufficiently large, the anti-vibration actuator 24 vibration attenuation amount is 6 dB or more above that of the viscoelastic members 18 (high anti-vibration effect).

As shown in FIG. 7, the viscoelastic members 18, which passively attenuate vibration, are effective for high frequency vibration attenuation, and the anti-vibration actuator 24, which actively attenuates vibration, is effective for low frequency vibration attenuation. Here, attenuating a low frequency vibration with the viscoelastic members 18 requires the use of viscoelastic members with a low elastic modulus. When a low elastic modulus member is used for the viscoelastic members 18, the imaging unit 16 vibration amplitude increases when the camera external case 12 is vibrated at a low frequency. The anti-vibration actuator 24 is capable of effectively attenuating low frequency vibration, but when the amplitude of the vibration to be attenuated increases, sufficient anti-vibration effect cannot be obtained, since the image-blur prevention lens 22a exceeds the motion limits within which it can move. In the present embodiment, sufficient anti-vibration effect from the anti-vibration actuator 24 is obtained by keeping the amount of vibration attenuation by the viscoelastic members 18 down to a low level.

Using the surveillance camera 1 of the first embodiment of the present invention, blurring of images when a high frequency shake is applied to surveillance camera 1 can be effectively suppressed by the synergistic effect of the viscoelastic members 18 serving as vibration-isolating support mechanism, and the anti-vibration actuator 24 serving as anti-vibration mechanism.

There is a tendency with the vibration attenuation resulting from the anti-vibration actuator 24 for the anti-vibration effect to diminish as frequency increases due to the lag in response. Therefore while sufficient corrective effect can be achieved at low frequencies, the anti-vibration effect diminishes at around several tens of Hz, and almost no effect is obtained when vibration exceeds 100 Hz.

In general use movie capture cameras, on the other hand, the maximum exposure time is limited by frame rate. The higher the frame rate, that is, the shorter is the limitation on time during which the shutter is open to capture individual images, and as frame rate increases, shaking of the individual images composing a movie by camera vibration is reduced.

By contrast, shaking between individual frames making up a movie, which is the shaking of images resulting from capturing static objects in a different position in each frame, increases as frequency increases when the movie camera is moved back and forth, and reaches a maximum at ½ the frame rate. In the surveillance camera 1 of the present embodiment, the amount of vibration attenuation at the target attenuation rate of $S_0$=−25 dB increases in the frequency band of $f_0$ Hz or above, which is ½ the frame rate frequency. Also, when sufficient vibration attenuation effect is achieved at ½ the frame rate frequency, image blurring is consequently reduced at vibration frequencies slower than that frequency.

In addition, at frequencies lower than the ½ frame rate, image blurring of individual frames does not increase even if the amount of shaking between movie frames increases, and sufficient functionality can therefore be achieved for surveillance camera purposes.

Since the vibration-isolating support mechanism is not actively controlled, the hold on the imaging unit 16 becomes unstable when, particularly at low frequencies, the vibration-isolating effect from the vibration-isolating support mechanism increases, making it difficult to maintain a stable optical axis in the imaging unit 16. It is therefore desirable to minimize the vibration-isolating effect of the vibration-isolating support mechanism.

Using the surveillance camera 1 of the first embodiment of the present invention, in the frequency band of ½ the frame rate or above the requisite image blur prevention effect is obtained by the combined effect of the viscoelastic members 18 and the anti-vibration actuator 24. It is therefore possible to set the vibration-isolating effect from the viscoelastic members 18 to a minimum, and to obtain sufficient image blur prevention effect while maintaining the optical axis of the imaging unit 16 in a stable manner.

Further, using the surveillance camera 1 of the first embodiment of the present invention, vibration at frequencies higher than the cross frequency $f_c$ is primarily attenuated by the viscoelastic members 18, therefore high frequency vibrations acting on the anti-vibration actuator 24 furnished with the imaging unit 16 are suppressed, thereby avoiding the problem whereby blurring of the image actually increases when a high frequency vibration is imposed on the anti-vibration actuator 24. Vibrations at frequencies below the cross frequency $f_c$ are primarily attenuated by the anti-vibration actuator 24, therefore support of the imaging unit can be prevented from becoming unstable by implementing the vibration-attenuating effect of the viscoelastic members 18 down into the low frequencies.

Moreover, in the surveillance camera 1 of the first embodiment of the present invention the cross frequency $f_c$ is set to approximately 30 Hz, therefore the anti-vibration actuator 24 and the viscoelastic members 18 can be designed without difficulty.

Using the surveillance camera 1 of the first embodiment of the present invention, the anti-vibration actuator 24 and the viscoelastic members 18 are constituted such that at a frequency of approximately 10 Hz, at which the amount of vibration attenuation resulting from the anti-vibration actuator 24 is sufficiently large, the amount of vibration attenuation resulting from the anti-vibration mechanism is approximately 15 dB larger (the vibration attenuation effect is higher) than the amount of vibration attenuation resulting from the vibration-isolating support mechanism. The amount of vibration attenuation resulting from the viscoelastic members 18 at low frequencies can therefore be set sufficiently small that shaking of the imaging unit 16 resulting from its support by the viscoelastic members 18 can be sufficiently suppressed. At a frequency of approximately 10 Hz, the amount of vibration attenuation resulting from the anti-vibration mechanism is preferably approximately 6 dB or greater above (the vibration attenuation effect is higher) the amount of vibration attenuation resulting from the vibration-isolating support mechanism.

Furthermore, using the surveillance camera 1 of the first embodiment of the present invention, the viscoelastic members 18 are disposed on both sides of a plane which includes the optical axis of the imaging optics. The imaging unit 16 is therefore supported in a well balanced manner by the viscoelastic members 18, so that excitation of vibration in a direction perpendicular to the optical axis can be prevented when a vibration is applied in the direction of the optical axis of the surveillance camera 1.

The surveillance camera 1 of the first embodiment of the present invention has case-side indicator portions 12b and camera-side indicator portions 16b for indicating the amount of displacement of the imaging unit 16 relative to the camera external case 12. Therefore by selecting the viscoelastic members 18 so that the case-side indicator portions 12b and the camera-side indicator portions 16b align, the vibration-isolating support mechanism can be easily set and adjusted to appropriate characteristics.

Moreover, using the surveillance camera 1 of the first embodiment of the present invention, the support frame is constituted by the camera external case 12 which covers the imaging unit, thus enabling the imaging unit 16 to be protected.

In the surveillance camera 1 of the first embodiment of the present invention, the block-shaped viscoelastic members 18 connect the imaging unit 16 and the camera external case 12 so as to shear deform when the imaging unit 16 is displaced relative to the camera external case 12 a direction perpendicular to the optical axis of the imaging optics. Therefore the shear deformation of the viscoelastic members effectively absorbs vibration energy so that vibrations transferred to the imaging unit can be effectively attenuated.

Furthermore, in the surveillance camera 1 of the first embodiment of the present invention the viscoelastic members 18 are disposed at positions rotationally symmetrical to the optical axis of the imaging optics, therefore the imaging unit 16 can be supported in a well-balanced manner, and excitation of vibration causing the optical axis of the imaging unit 16 to rotate about the center when vibration is applied in a direction perpendicular to the optical axis can be suppressed.

In the surveillance camera 1 of the first embodiment of the present invention the viscoelastic members 18 are disposed on both sides of a plane passing through the center of gravity of the imaging unit and perpendicular to the optical axis of the imaging optics, such that when an external force within the plane is applied to the imaging unit 16, the optical axis of the imaging optics moves essentially in parallel thereto. Therefore the imaging unit 16 can be supported in a well-balanced manner, and excitation of vibration causing the optical axis of the imaging unit 16 to tilt when vibration is applied in a direction perpendicular to the optical axis can be suppressed.

In the surveillance camera 1 of the first embodiment of the present invention, the camera external case 12 can be used by affixing to a structural object, and image blurring can be effectively suppressed and clear surveillance images captured even when the structural object is vibrated at a high frequency.

Also, in the surveillance camera 1 of the first embodiment of the present invention the imaging element 20 is constituted to capture infrared light images, therefore images can be captured even in dark locations.

Figure 8:
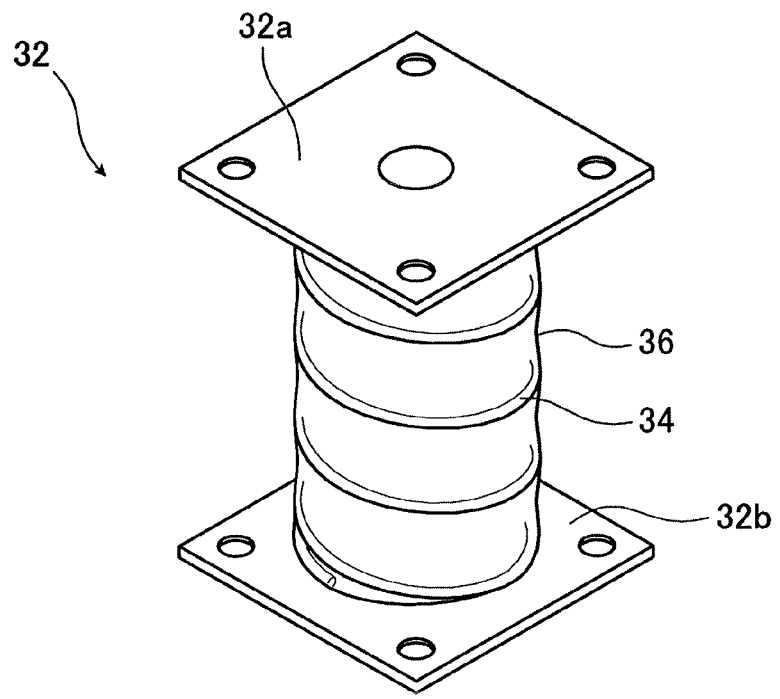
FIG. 8 A perspective view showing variations of a viscoelastic member.

In the above-described first embodiment, block-shaped members of viscoelastic material were used as the viscoelastic members 18, but as a variant example, a composite material can also be used for the viscoelastic members. As shown in FIG. 8, a cylindrical object may be used as a viscoelastic member. In the viscoelastic member 32 shown in FIG. 8, the outside perimeter of steel coil spring 34 is covered by a tube 36 made of viscoelastic material. This cylindrical viscoelastic members 32 is oriented so that its axial line is approximately parallel to the optical axis A of the imaging unit 16, with one end portion 32a in the axial direction affixed to the camera external case 12, and the other end portion 32b affixed to the imaging unit 16 for use. By being thus attached, the viscoelastic member 32 shear deforms in such a way that the end portion 32a and end portion 32b separate in a direction perpendicular to the axial line.

Figure 9:
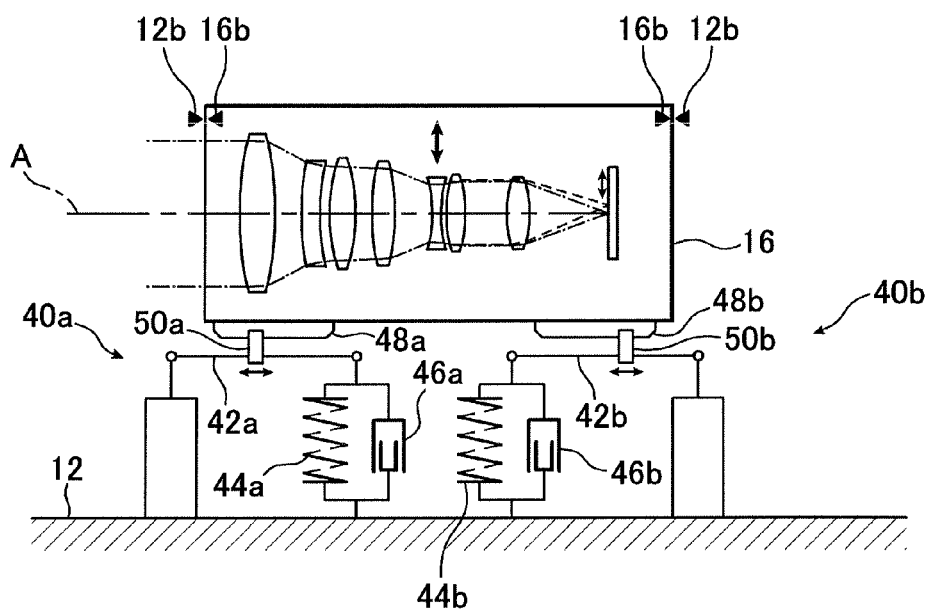
FIG. 9 A cross section schematically showing a surveillance camera according to a second embodiment of the present invention.
Figure 10:
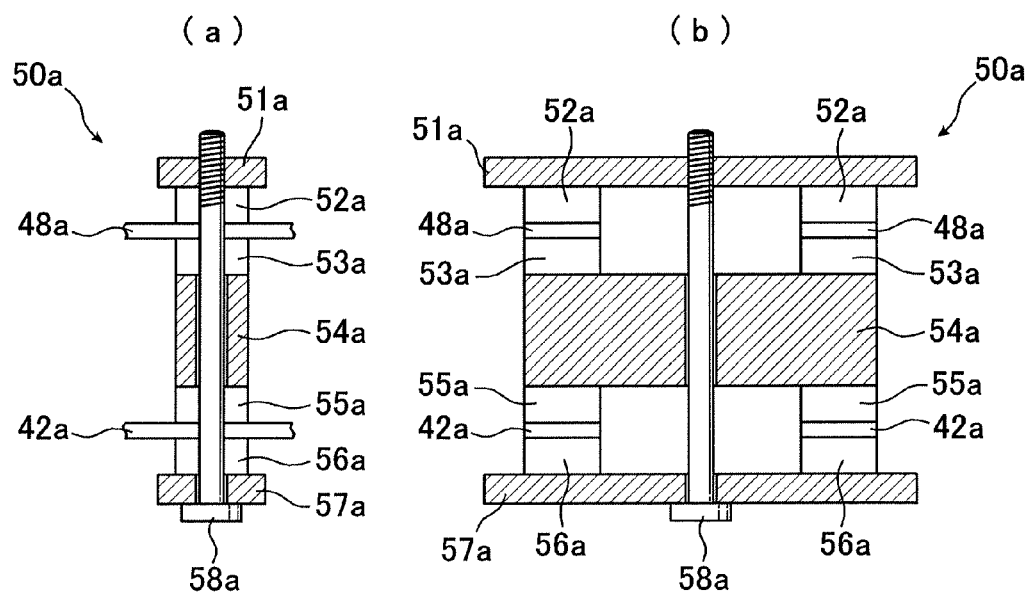
FIG. 10 (a) An expanded view of the clamp member shown in FIG. 9, and (b) a diagram seen from the optical axis direction of the clamp member thereof.

Next, referring to FIGS. 9 and 10, we discuss a surveillance camera according to a second embodiment of the present invention. In the surveillance camera of the present embodiment, the vibration-isolating support mechanism for supporting the imaging unit relative to the camera external case is different from that described in the first embodiment. Therefore we will here discuss only those portions of the present embodiment which differ from the first embodiment, and will omit a discussion of those parts which are the same.

FIG. 9 is a cross section schematically showing a surveillance camera according to a second embodiment of the present invention. FIG. 10 is (a) an expanded view of the clamp member shown in FIG. 9, and (b) a diagram seen from the optical axis direction of the clamp member thereof.

As shown in FIG. 9, in the surveillance camera of the present embodiment the imaging unit 16 is supported in a vibration-isolated manner relative to the camera external case 12 by vibration-isolating support mechanisms 40a and 40b. Note that the vibration-isolating support mechanisms 40a, 40b support the imaging unit 16 in the vertical direction in FIG. 9, but the surveillance camera is also furnished with a vibration-isolating support mechanism (not shown) for supporting the imaging unit 16 in a direction perpendicular to the page in FIG. 9.

As shown in FIG. 9, the vibration-isolating support mechanism 40a has an arm 42a rotatably attached to the camera external case 12, a spring 44a and damper 46a for causing a viscoelastic force to act on the rotation of this arm 42a, a rail 48a attached to the imaging unit 16, and a clamp member 50a for connecting the arm 42a and the rail 48a. Similarly, the vibration-isolating support mechanism 40b has an arm 42b, a spring 44b and damper 46b, a rail 48b, and a clamp member 50b, and is constituted in substantially the same way as the vibration-isolating support mechanism 40a. Therefore we discuss below only the constitution of the vibration-isolating support mechanism 40a.

Note that in FIG. 9, one each of arms 42a and 42b, and rails 48a and 48b are respectively shown, but in the embodiment two each of the respective arms and rails are provided in parallel (see FIG. 10(b)). Displacement of the imaging unit 16 in the vertical direction due to the rotation of the arm 42a is therefore allowed; the direction of this displacement is parallel to the vertical plane which includes the optical axis of the imaging unit 16, and the vibration-isolating support mechanism 40a is disposed on both sides of this plane. The vibration-isolating support mechanism 40b and the vibration-isolating support mechanism (not shown) which supports the imaging unit 16 in a direction perpendicular to the page on which FIG. 9 is shown are also disposed in this manner.

The arm 42a is a rod-shaped member; one end thereof is rotatably attached to the inside of the camera external case 12, and the other end is connected to the spring 44a and the damper 46a; the arm is disposed to extend approximately parallel to the optical axis A of the imaging unit 16.

The spring 44a and damper 46a are connected in series, and each is respectively attached to the inside of the camera external case 12, while the other end is attached to the tip of the arm 42a. Thus when the arm 42a rotates about a fulcrum, the spring 44a and damper 46a expand and contract, the spring 44a causes an elastic force to act on the rotation about the fulcrum of the arm 42a, and the damper 46a causes a viscous force to act on the rotation about the fulcrum of the arm 42a.

The rail 48a is a rod-shaped member, affixed so as to extend approximately in parallel to the optical axis A on the perimeter of the imaging unit 16.

As shown in FIG. 10, the clamp member 50a connects the arm 42a and the rail 48a, and is slidably attached along the arm 42a and the rail 48a.

The clamp member 50a has a metal upper rod 51a, an intermediate block 54a, and a lower rod 57a; pads 52a, 53a, 55a, and 56a, comprised of a material with some degree of flexibility, are attached to these members.

The upper rod 51a and lower rod 57a are rod-shaped members formed of a material such as steel, aluminum, titanium, etc. The intermediate block 54a is a block-shaped member formed of a material such as steel, aluminum, titanium, etc.

As shown in FIG. 10, a screw 58a is screwed into a female screw hole formed on the upper rod 51a through a through hole formed in the lower rod 57a and the intermediate block 54a. Therefore by tightening this screw 58a, the lower rod 57a is pulled to the upper rod 51a, thus clasping the arm 42a and the rail 48a.

The pads 52a, 53a, 55a, and 56a are members formed of a material such as polyurethane, polyethylene, Teflon, or the like.

The pad 52a is attached to the bottom surface of the upper rod 51a and the pad 53a is attached to the top surface of the intermediate block 54a; rails 48a are sandwiched between the two. The pad 55a is attached to the bottom surface of the intermediate block 54a, and the pad 56a is attached to the top surface of the lower rod 57a; arms 42a are sandwiched between the two. Each pad is composed of material having some degree of flexibility so that scratching or wear of the contacting parts of the arm 42a and the rail 48a when subjected to vibration can be avoided.

The upper rod 51a and lower rod 57a are pressed together by tightening the center screw 58a, and the arms 42a and rails 48a are integrated as a single piece with the clamp member 50a.

By loosening the center screw 58a, the arm 42a and rail 48a are released from the clamp member 50a, enabling it to slide in the direction shown by the arrow in FIG. 9, thus enabling the elastic characteristics of the imaging unit 16 support to be changed.

Because of the above-described structure of the vibration-isolating support mechanism 40a, the viscoelastic force operating on the imaging unit 16 as a result of sliding the clamp member 50a changes, thereby enabling the vibration attenuation rate $S_p(f)$ resulting from the vibration-isolating support mechanism to be adjusted. In FIG. 9, that is, moving the clamp member 50a to the left results in an increase in the amount of expansion/contraction of the spring 44a and damper 46a relative to the vertical movement of the imaging unit 16, thereby strengthening elastic force and viscous force. Conversely, when the clamp member 50a is moved the right, the amount of expansion/contraction of the spring 44a and damper 46a relative to the vertical movement of the imaging unit 16 decreases, thereby weakening elastic force and viscous force. In the vibration-isolating support mechanism 40b, on the other hand, moving the clamp member 50b to the right in FIG. 9 results in stronger elastic force and viscous force, while moving clamp member 50b to the left results in weaker elastic force and viscous force.

In the surveillance camera of the present embodiment, adjustment to attain the required vibration attenuation rate $S_p(f)$ using the vibration-isolating support mechanism is accomplished by sliding the positions of each of the vibration-isolating support mechanism clamp members. When so doing, the positions of each of the clamp members are adjusted to align each of the case-side indicator portions 12b disposed on the camera external case 12 with each of the camera-side indicator portions 16b disposed on the imaging unit 16.

In the present embodiment the imaging unit 16 imaging optics 22 are constituted to be interchangeable as lens units, appropriate to telephoto and wide-angle photography. Making the vibration-isolating support mechanism adjustable allows for easy adaptation to changes in the weight and in the center of gravity of the imaging unit 16 when lens units are interchanged. The optimal vibration attenuation rate can thus be set for each of the different types of lens units when they are mounted on the imaging unit 16.

Using the surveillance camera of the second embodiment of the present invention, the vibration attenuation rate can be adjusted by sliding the clamp members 50*a* and 50*b*. Therefore when the entirety of the imaging unit 16, or the imaging optics 22, are made interchangeable, the characteristics of the vibration-isolating support mechanisms 40*a*, 40*b* can be adjusted to fit the mounted imaging unit 16, thus enabling the image blur prevention effect to be appropriately set.

Figure 11:
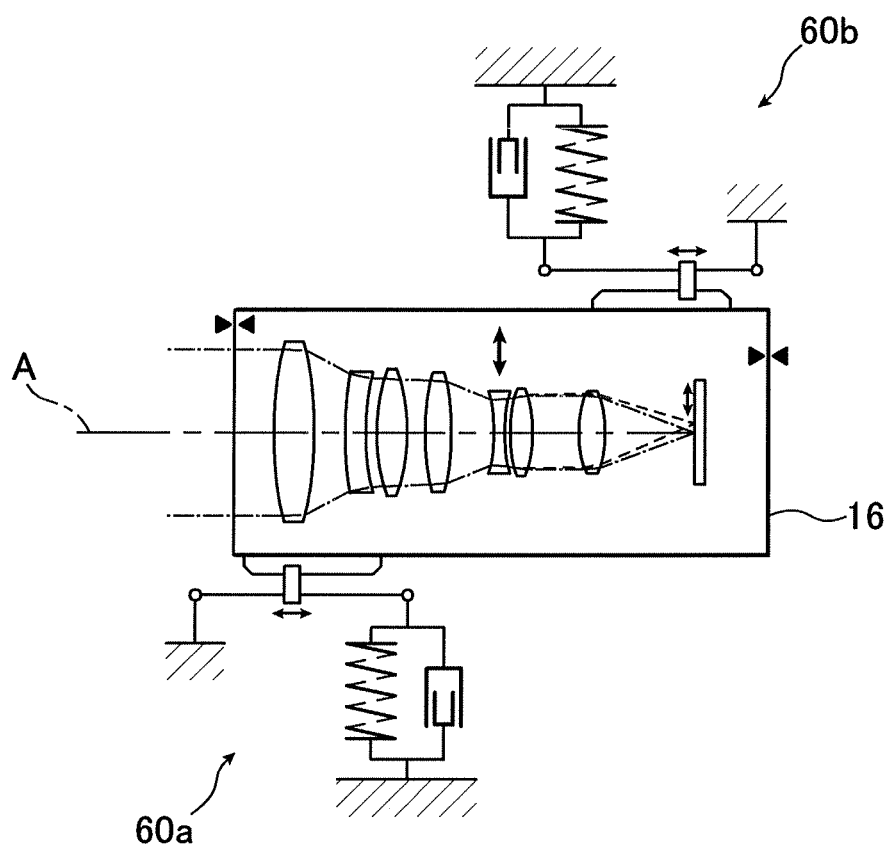
FIG. 11 A diagram showing a variant example of the vibration-isolating support mechanism in a surveillance camera according to a second embodiment of the present invention.

Note that in the second embodiment shown in FIG. 9, two of the vibration-isolating support mechanisms directed at vibration in the vertical direction of FIG. 9 were disposed on the bottom side of the imaging unit 16, but as a variation it is also possible to dispose the vibration-isolating support mechanism as shown in FIG. 11. As shown in FIG. 11, that is, the vibration-isolating support mechanisms 60*a*, 60*b* directed at vibration in the vertical direction of FIG. 11 can be disposed in by dividing into the top side and the bottom side of the imaging unit 16.

When there is a large vibration component in the direction parallel to the optical axis, disposing the vibration-isolating support mechanisms 40*a* and 40*b* as shown in FIG. 9 results in an increased tendency toward excitation of vibration, causing the imaging unit 16 optical axis to incline when vibration is received in a direction parallel to the optical axis. As shown in FIG. 11, this type of effect can be reduced by disposing the vibration-isolating support mechanisms 60*a*, 60*b* at positions which are balanced relative to the optical axis.

EXPLANATION OF REFERENCE NUMERALS

1: surveillance camera (movie capture camera)
12: camera external case (support frame)
12*a*: case-side attachment portions
12*b*: case-side indicator portions (indicator portions)
16: imaging unit
16*a*: camera-side attachment portions
16*b*: camera-side indicator portions (indicator portions)
18: viscoelastic members (vibration-isolating support mechanism)
20: imaging element
22: imaging optics
22*a*: image-blur prevention lens 22*a*
24: anti-vibration actuator 24 (anti-vibration mechanism)
26: camera gyro sensor
30: control section
32: viscoelastic members
32*a*: end portions
32*b*: end portions
34: coil spring
36: tube
40*a*, 40*b*: vibration-isolating support mechanisms
42*a*, 42*b*: arms
44*a*, 44*b*: springs
46*a*, 46*b*: dampers
48*a*, 48*b*: rails
50*a*, 50*b*: clamp members
51*a*: upper rod
52*a*, 53*a*: pads
54*a* intermediate block
55*a*, 56*a*: pads
57*a*: lower rod
58*a*: screw
60*a*, 60*b*: vibration-isolating support mechanisms

The invention claimed is:

1. A camera for capturing moving images furnished with an image-blur prevention function, comprising:
   an imaging unit for capturing moving images; and
   a support frame provided with a vibration-isolating support mechanism for supporting the imaging unit;
   wherein the imaging unit includes:
   imaging optics;
   an imaging element for receiving light focused by the imaging optics; and
   an anti-vibration mechanism for stabilizing images formed on the imaging element; and
   wherein the anti-vibration mechanism and the vibration-isolating support mechanism are adapted to satisfy the inequality:

$$S_a(f)+S_p(f)<S_0, \text{ for } f>=f_0$$

where $S_a(f)$ denotes the rate in dB of vibration attenuation produced by the anti-vibration mechanism at a frequency f, $S_p(f)$ denotes the rate in dB of vibration attenuation produced by the vibration-isolating support mechanism at a frequency f, $S_0$ denotes a predetermined target dB rate of attenuation, and $2f_o$ denotes a frame rate frequency for moving images captured by the imaging unit.

2. The camera according to claim 1, wherein the anti-vibration mechanism and vibration-isolating support mechanism are constituted so that at frequencies higher than a predetermined cross frequency $f_c$, the amount of vibration attenuation resulting from the vibration-isolating support mechanism is greater than the amount of vibration attenuation resulting from the anti-vibration mechanism, and at frequencies lower than the cross frequency $f_c$, the amount of vibration attenuation resulting from the anti-vibration mechanism is greater than the amount of vibration attenuation resulting from the vibration-isolating support mechanism.

3. The camera according to claim 2, wherein the predetermined cross frequency $f_c$ is between 20 and 40 Hz.

4. The camera according to claim 1, wherein the anti-vibration mechanism and the vibration-isolating support mechanism are constituted so that at a frequency of 10 Hz, the amount of vibration attenuation resulting from the anti-vibration mechanism is 6 dB or greater more than the amount of vibration attenuation resulting from the vibration-isolating support mechanism.

5. The camera according to claim 1, wherein the vibration-isolating support mechanism has an arm rotatably attached to a support frame, a spring and damper for imparting viscoelastic force to the rotation of the arm, and a clamp member for connecting the arm and the imaging unit, slidably attached to the arm in the direction of the optical axis of the imaging optics; and the rate of vibration attenuation is adjusted by sliding the clamp member.

6. The camera according to claim 1, wherein the vibration-isolating support mechanism is disposed on both sides of a plane which includes the optical axis of the imaging optics.

7. The camera according to claim 1, further comprising a vibration-isolating support mechanism adjustment indicator portion for indicating the amount of displacement of the imaging unit relative to the support frame.

8. The camera according to claim 1, wherein the support frame is a case for covering at least a part of the imaging unit.

9. The camera according to claim 1, wherein the camera is a surveillance camera used by affixing the support frame to a structural object.

10. The camera according to claim 1, wherein the imaging element is constituted to capture infrared light images.

* * * * *